No. 634,806. Patented Oct. 10, 1899.
J. T. DAVEY.
TOBACCO PIPE.
(Application filed Apr. 20, 1899.)
(No Model.)
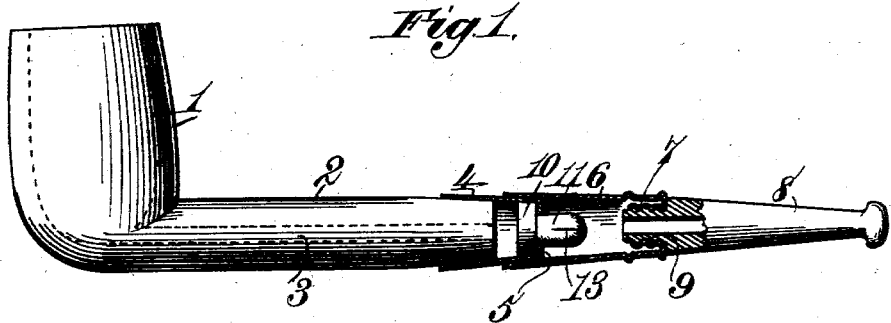
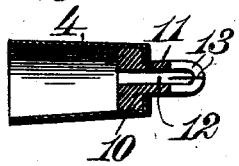 
Witnesses.
Robert Everett.
Inventor,
John T. Davey.
By James L. Norris.
Atty.

UNITED STATES PATENT OFFICE.

JOHN T. DAVEY, OF ASHLAND, WISCONSIN.

TOBACCO-PIPE.

SPECIFICATION forming part of Letters Patent No. 634,806, dated October 10, 1899.

Application filed April 20, 1899. Serial No. 713,779. (No model.)

*To all whom it may concern:*

Be it known that I, JOHN T. DAVEY, a citizen of the United States, residing at Ashland, in the county of Ashland and State of Wisconsin, have invented new and useful Improvements in Tobacco-Pipes, of which the following is a specification.

This invention relates to tobacco-pipes, and has for its object to provide improved means which, while permitting the free and uninterrupted passage of the smoke from the bowl of the pipe through the stem to the mouth of the smoker, will automatically and effectually prevent the entrance of saliva and moisture from the smoker's mouth into the stem of the pipe.

To this end my invention consists in the features and in the construction and arrangement of parts hereinafter described, and particularly pointed out in the claim following the description, reference being had to the accompanying drawings, forming a part of this specification, wherein—

Figure 1 is a sectional elevation of my improved pipe. Fig. 2 is an enlarged detail sectional view, and Fig. 3 an enlarged detail perspective view of a part thereof.

Referring to the drawings, the numeral 1 indicates the pipe-bowl, 2 the stem, and 3 the bore or smoke-passage, formed in the stem and communicating with the bottom of the bowl in the usual manner. Fitted over the end of the stem 2 is a short tube 4, provided at its inner end with an inwardly-projecting flange 5, and fitted over the end of the tube 4 is a sheet-metal tube 6, which at its inner end is turned or spun inwardly, as shown, and screw-threaded, as at 7. The mouthpiece 8 is provided with a reduced and threaded end 9, which is screwed into the threaded end 7 of the tube 6. The means shown for attaching the mouthpiece to the stem form no part of the present invention, and said mouthpiece may be attached to the stem in any known or preferred manner. Arranged in the tube 4 is a rubber plug 10, having formed integrally therewith a teat or tubular extension 11. The plug 10 seats against the flange 5 and the teat 11 projects therethrough into the tube 6. The plug and teat are provided with a central bore or smoke-passage 12, that extends entirely through the plug and nearly to the end of the latter, and the tip or extreme end of the latter is provided with two or more slits 13, formed transversely to one another, as most clearly shown in Fig. 3 of the drawings, and which extend entirely through the wall of the teat to the central bore or smoke-passage.

As shown most clearly in Fig. 2 of the drawings, the teat 11 projects into the tube 6, which latter is of greater diameter than the teat and forms a trap or settling chamber for the saliva and condensed moisture, and also permits the free operation of the teat, as will presently appear.

The operation of my improved pipe is as follows: The smoke drawn from the bowl passes through the stem and mouthpiece as usual, the slitted portion of the teat readily opening to permit the passage of the smoke therethrough; but the moment the user ceases to draw on the stem or should he breathe or blow into the latter the slitted end of the teat will immediately close, and thereby prevent the entrance of any saliva or moisture into the stem or bowl of the pipe. Such saliva or moisture as may pass through the mouthpiece is caught and retained in the tube 6, and this may be removed or discharged from time to time by slipping the tube 6 from off the tube 4.

By means of the improved arrangement shown and described the saliva and moisture are prevented from entering the stem or bowl of the pipe, whereby the nicotine is unable to collect in the smoke-passage, thereby preventing the latter from becoming foul and clogged up and delivering the smoke to the user's mouth in a sweet and clean condition and without loss of any of the soothing and narcotic effects of the tobacco.

I have shown and described my invention as applied to a pipe; but it will be manifest that it may with equal success be applied to cigar and cigarette holders and other smoking devices. It will also be manifest that the plug may be made of other material than rubber; but owing to its pliability and resiliency I prefer to employ rubber for the purpose.

Having described my invention, what I claim is—

In a smoking device, the combination with an apertured stem and mouthpiece, of a tube intermediate the stem and mouthpiece and provided at its inner end with an inwardly-projecting flange, and a cylindrical plug removably fitted in said tube against the flange and provided with an integral elastic teat of less diameter than the plug and projecting through said flange, said plug and teat being provided with a central bore extending entirely through the plug and nearly to the end of the teat, the tip of the teat being provided with a plurality of slits formed at an angle to one another, substantially as described.

In testimony whereof I have hereunto set my hand in presence of two subscribing witnesses.

JOHN T. DAVEY.

Witnesses:
    O. H. FOSTER,
    WM. BULLIS.